US008631581B2

(12) United States Patent
Sera et al.

(10) Patent No.: US 8,631,581 B2
(45) Date of Patent: Jan. 21, 2014

(54) METHOD FOR FORMING A WHEEL BEARING APPARATUS

(75) Inventors: Akira Sera, Iwata (JP); Jun Numamoto, Iwata (JP)

(73) Assignee: NTN Corporation, Osaka-shi (JP)

( * ) Notice: Subject to any disclaimer, the term of this patent is extended or adjusted under 35 U.S.C. 154(b) by 590 days.

(21) Appl. No.: 12/945,090

(22) Filed: Nov. 12, 2010

(65) Prior Publication Data

US 2011/0061238 A1 Mar. 17, 2011

Related U.S. Application Data

(63) Continuation of application No. PCT/JP2009/002034, filed on May 11, 2009.

(30) Foreign Application Priority Data

May 13, 2008 (JP) ................... 2008-126058

(51) Int. Cl.
  *B21D 53/10* (2006.01)
  *B60B 27/00* (2006.01)
  *B21B 11/00* (2006.01)
(52) U.S. Cl.
  USPC ............. 29/898.062; 29/898.066; 29/898.04; 29/898.07; 29/894.361; 29/894.362; 29/505; 29/512; 72/67; 301/105.1; 384/544; 384/589
(58) Field of Classification Search
  USPC ................ 29/898, 898.04, 898.062, 898.066, 29/898.07, 894.361, 894.362, 505, 507, 29/512; 72/67, 112, 370.11, 125, 370.21; 384/544, 589; 301/105.1
  See application file for complete search history.

(56) References Cited

U.S. PATENT DOCUMENTS

| 4,893,960 | A | 1/1990 | Beier et al. |
| 6,772,615 | B2 * | 8/2004 | Hagiwara et al. ................. 72/67 |
| 6,782,622 | B2 * | 8/2004 | Hagiwara et al. ................. 72/67 |
| 6,785,965 | B2 * | 9/2004 | Sawai et al. ............. 29/894.362 |
| 7,900,358 | B2 * | 3/2011 | Tsuzaki et al. ............. 29/898.07 |
| 2003/0138176 | A1 | 7/2003 | Umekawa et al. |
| 2007/0227004 | A1 | 10/2007 | Tsuzaki et al. |
| 2009/0045670 | A1 | 2/2009 | Enomoto et al. |

FOREIGN PATENT DOCUMENTS

| DE | 36 36 243 | 5/1988 |
| EP | 1 839 787 | 10/2007 |
| ES | 2 005 652 | 3/1989 |
| FR | 2 605 557 | 4/1988 |
| GB | 2 199 390 | 7/1988 |
| GB | 2 386 163 | 9/2006 |

(Continued)

*Primary Examiner* — Sarang Afzali
(74) *Attorney, Agent, or Firm* — Harness, Dickey & Pierce, P.L.C.

(57) ABSTRACT

A method for forming a wheel bearing apparatus where the end portion of the cylindrical portion is pre-formed as a cylinder prior to its plastic deformation to form the caulking portion. A caulking tool with a punch and a swing shaft abuts against the end portion of the cylinder at a predetermined inclined angle relative to the inner circumferential surface of the cylinder. Teeth on the punch form the face-spline by plastically deforming the end face of the caulking portion. The swing shaft central axis is inclined at an angle relative to a central axis of the wheel hub. The face-spline is formed simultaneously with the formation of the caulking portion by advancing the caulking tool toward the wheel hub. A main shaft is rotated to cause a swing motion of the caulking tool.

7 Claims, 6 Drawing Sheets

(56) References Cited

FOREIGN PATENT DOCUMENTS

| | | |
|---|---|---|
| IT | 1220082 | 6/1990 |
| JP | 63-184501 | 7/1988 |
| JP | 2001-162338 | 6/2001 |
| JP | 2003-211908 | 7/2003 |
| JP | 2005-036905 | 2/2005 |
| JP | 2007-062647 | 3/2007 |
| JP | 2007-230551 | 9/2007 |
| JP | 2007-271045 | 10/2007 |
| JP | 2007-290681 | 11/2007 |
| JP | 2007-319865 | 12/2007 |
| WO | WO 2007/119595 | 10/2007 |

* cited by examiner

PRIOR ART

Fig 6

PRIOR ART

METHOD FOR FORMING A WHEEL BEARING APPARATUS

CROSS-REFERENCE TO RELATED APPLICATIONS

This application is a continuation of International Application No. PCT/JP2009/002034, filed May 11, 2009, which claims priority to Japanese Application No. 2008-126058, filed May 13, 2008. The disclosures of the above applications are incorporated herein by reference.

FIELD

The present disclosure relates to a method of forming a wheel bearing apparatus to rotatably support a driving wheel of a vehicle, such as an automobile. More particularly, the disclosure relates to a method of simultaneously forming a caulking portion and a face-spline on a wheel hub of a wheel bearing apparatus formed as a separable unit of a bearing portion and a constant velocity universal joint.

BACKGROUND

A power transmitting apparatus of a vehicle, such as an automobile, that transmits engine power to the wheels is required to absorb both radial and axial displacements as well as a moment variation of the power transmitting apparatus from wheels. The moment variation is caused by bounds and cornering of the vehicle during running on a rough road. Accordingly, one end of a drive shaft, interposed between an engine side and a driving wheel side of the power transmitting apparatus, is connected to a differential gear unit, via a slide type constant velocity universal joint. The other end of the drive shaft is connected to a wheel via a wheel bearing apparatus including an immovable type constant velocity universal joint.

Recently, improvements in fuel consumption are strongly desired in view of resource saving or environmental pollution. A reduction of weight of the wheel bearing apparatus, among other automobile parts, is especially desired to achieve improvements in fuel consumption. Although various proposals have been made regarding the weight reduction of the wheel bearing apparatus, in assembling sites and servicing markets of automobiles, reduction of cost by simplifying the assembling and disassembling works has also been a very important factor.

Figure 5:
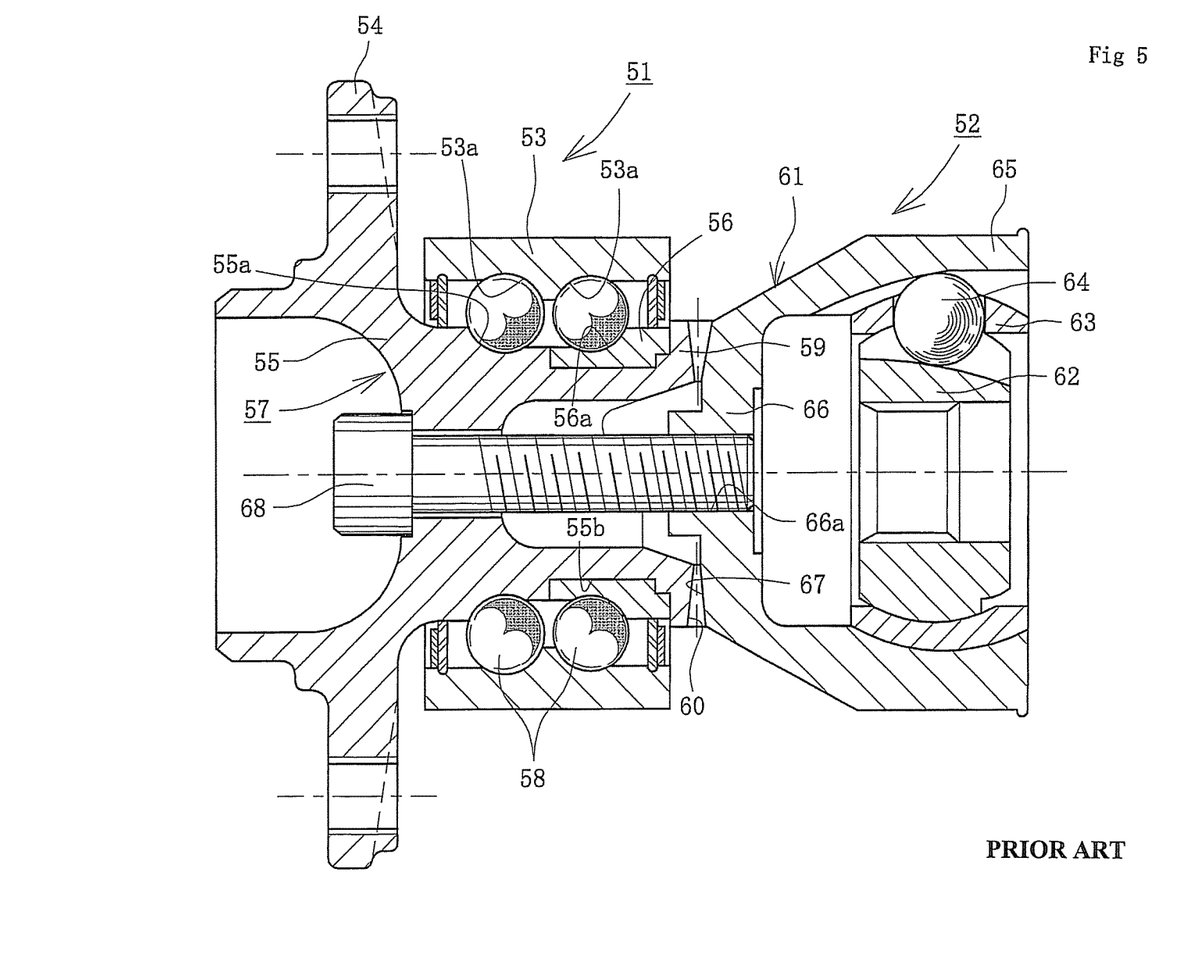
FIG. 5 is a longitudinal section view of a prior art vehicle wheel bearing apparatus.

FIG. 5 shows one representative example of a wheel bearing apparatus that can satisfy these requirements. The wheel bearing apparatus is formed as a separable unit with a double row rolling bearing 51 and a constant velocity universal joint 52. The double row rolling bearing 51 includes an outer member 53, inner member 57 and double row balls. The outer member 53 is integrally formed, on its inner circumference, with double row outer raceway surfaces 53a, 53a. The inner member 57 includes a wheel hub 55 and an inner ring 56 formed with a double row inner raceway surfaces 55a, 56a, respectively. The double row balls 58, 58 are rollably contained between the outer and inner raceway surfaces. The double row inner raceway surfaces 55a, 56a of the inner member 57 are arranged opposite to the double row outer raceway surfaces 53a, 53a of the outer member 53. The wheel hub 55 has a wheel mounting flange 54 integrally formed at its one end. A cylindrical portion 55b axially extends from the inner raceway surface 55a. The inner ring 56 is press-fit onto the cylindrical portion 55b of the wheel hub 55. The inner ring 56 is axially rigidly secured by a caulking portion 59. The caulking portion is formed by plastically deforming the cylindrical portion 55b of the wheel hub 55 radially outward. A torque transmitting face-spline 60 is formed on an inner end face of the caulking portion 59.

The constant velocity universal joint 52 includes an outer joint member 61, a joint inner ring 62, a cage 63, and torque transmitting balls 64. The outer joint member 61 includes a cup-shaped portion 65 and a shoulder portion 66 that forms the bottom of the cup-shaped portion 65. An inner thread 66a is formed in the bottom of the cup-shaped portion 65. An end face of the shoulder portion 66 is formed with a face-spline 67. The face-spline 67 engages the face-spline 60 formed on the inner end face of the caulking portion 59. Thus, a rotational torque from a drive shaft (not shown) can be transmitted to the wheel mounting flange 54, via the constant velocity universal joint 52 and the wheel hub 55.

A fastening bolt 68 is screwed into the inner thread 66a on the shoulder portion 66. This fastening engages the face-splines 67, 60 to each other to unite the separate double row rolling bearing 51 and the constant velocity universal joint 52. Accordingly, it is possible to reduce both weight and size of the wheel bearing apparatus and to simplify assembly and disassembly.

Figure 6:
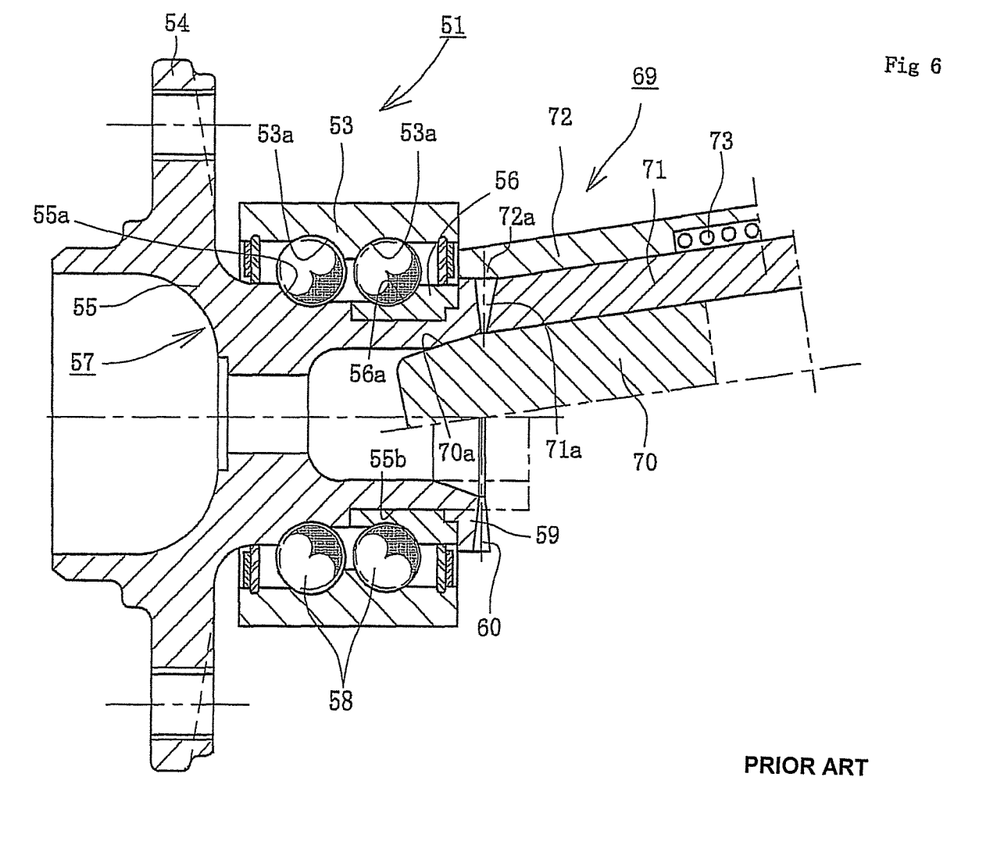
FIG. 6 is an explanatory view of the caulking process of FIG. 5.

As shown in FIG. 6, a caulking tool 69 forms the face-spline 60 of the caulking portion 59 simultaneously with the formation of the caulking portion 59. The caulking tool 69 is formed with a guiding portion 70a with a tapered configuration at its tip end. A mandrel 70 is adapted to be arranged at an inclined angle relative to an axis of the wheel hub 55. An inner sleeve 71 is formed with teeth 71a at its tip end. An outer sleeve 72 has a confining portion 72a to limit radial expansion of the caulking portion 59. A coil spring 73 is interposed between the outer and inner sleeves 72 and 71. Thus, the outer sleeve 72 can be moved independently relative to the inner sleeve 71.

The caulking tool 69 is made to have a swing motion by rotating the wheel hub 55 around its central axis. The end portion of the cylindrical portion 55b of the wheel hub 55 is plastically deformed by the swing motion of the caulking tool 69. Thus, the caulking portion 59 is formed. During the formation of the caulking portion 59, the face-spline 60 is also simultaneously formed by pushing the teeth 71a of the inner sleeve 71 against the caulking portion 59. See, U.S. Pat. No. 4,893,960.

In such a wheel bearing apparatus, since the face-spline 60 can be formed simultaneously with the caulking portion 59 by swing caulking, it is possible to improve the workability as well as to reduce the number of machining steps. Thus, it is possible to reduce the manufacturing cost. However, there have been several problems associated with the manufacturing. One such problem is that metal molds of the caulking tool are complicated and thus their machining, assembly and management manpower are increased. Another problem is that material of the wheel hub is liable to enter into gaps between the mandrel 70 and sleeves 71, 72. Thus, burrs are generated and separate burrs remain in the working site and therefore reduce the workability. Another problem is that burrs generated on the caulking portion 59 and/or the face-spline 60 detracts from the quality of the wheel bearing apparatus.

SUMMARY

It is, therefore, an object of the present disclosure to provide a method of forming a wheel bearing apparatus that can simplify the caulking tool and thus reduce manufacturing costs. Additionally, it prevents the generation of burrs, and thus improves the quality of the wheel bearing apparatus.

To achieve the object of the present disclosure, a method is disclosed for forming a wheel bearing apparatus. The wheel bearing apparatus comprises an outer member, an inner member and double row rolling elements. The outer member is integrally formed, on its inner circumference, with double row outer raceway surfaces. The inner member includes a wheel hub and at least one inner ring. The inner member is formed with double row inner raceway surfaces to be arranged opposite to the double row outer raceway surfaces. The wheel hub has a wheel mounting flange integrally formed at its one end. A cylindrical portion axially extends from the inner raceway surface. The inner ring is press-fit onto the cylindrical portion of the wheel hub. The double row rolling elements are rollably contained between the inner and outer raceway surfaces of the inner member and the outer member. The inner ring is axially secured rigidly by a caulking portion. The caulking portion is formed by plastically deforming the cylindrical portion of the wheel hub radially outward. A torque transmitting face-spline is formed on an end face of the caulking portion. The end portion of the cylindrical portion is pre-formed as a cylinder prior to its plastic deformation to form the caulking portion. A caulking tool comprises a punch and a swing shaft. The punch has a nose portion projecting from a bottom surface of the punch at its center. The nose portion is adapted to abut against the end portion of the cylinder at a predetermined inclined angle relative to the inner circumferential surface of the cylinder. Teeth are formed around the nose portion to form the face-spline by plastically deforming the end face of the caulking portion. The swing shaft has the punch rigidly secured thereon so that the phase of the punch is not shifted relative to the wheel hub. The swing shaft also has a central axis that forms a predetermined inclined angle relative to a central axis of the wheel hub. The face-spline is formed simultaneously with the caulking portion by advancing the caulking tool toward the wheel hub and pushing the punch against the end portion of the cylinder with a predetermined working force. A main shaft, with a rotational axis corresponding to the central axis of the wheel hub, is rotated to cause a swing motion of the caulking tool.

The method for forming a wheel bearing apparatus has the inner ring axially rigidly secured by a caulking portion. The caulking portion is formed by plastically deforming the cylindrical portion of the wheel hub radially outward. A torque transmitting face-spline is formed on an end face of the caulking portion. The end portion of the cylindrical portion is pre-formed as a cylinder prior to its plastic deformation to form the caulking portion. A caulking tool includes a punch and a swing shaft. The punch has a nose portion projecting from a bottom surface of the punch at its center adapted to abut against the end portion of the cylinder at a predetermined inclined angle relative to the inner circumferential surface of the cylinder. Teeth are formed around the nose portion to form the face-spline by plastically deforming the end face of the caulking portion. The swing shaft has the punch rigidly secured so that the phase of the punch is not shifted relative to the wheel hub. The swing shaft also has a central axis that forms a predetermined inclined angle relative to a central axis of the wheel hub. The face-spline is formed simultaneously with the formation of the caulking portion by advancing the caulking tool toward the wheel hub and pushing the punch against the end portion of the cylinder with a predetermined working force. A main shaft, with a rotational axis corresponding to the central axis of the wheel hub, is rotated to cause a swing motion of the caulking tool. Thus, it is possible to simplify the structure of the metal molds, and to reduce the number of machining, assembly and management steps of the metal molds. Thus, this reduces the manufacturing cost.

Accordingly, it is possible to prevent problems such as the generation of burrs on the caulking portion and/or the face-spline and deposition of fallen-off burrs on the working site. Accordingly, it is possible to improve quality of the wheel bearing apparatus.

The inclined angle of the central axis of the swing shaft relative to the central axis of the wheel hub is set within a range of 4°-6°.

The inclined angle of the nose portion of the punch is set within a range of 15°-35°.

The punch is secured to the swing shaft via a key.

The wheel hub is vertically placed on a pedestal where a plurality of knock-pins are mounted. Thus, the outer side surface of the wheel mounting flange contacts against the top surface of the pedestal. The knock-pins fit through apertures where hub bolts are press-fit. This makes it possible to firmly secure the wheel hub on the pedestal without requiring any other fastening mechanism.

An annular groove is formed on the outer circumferential surface of the cylinder of the cylindrical portion. A cross-sectional configuration of the annular groove has a depth of 0.5-1.0 mm. The groove has an inner side circular arc surface with a radius of curvature $Ri$ and an outer side circular arc surface with a radius of curvature $Ro$. The radius of curvature $Ri$ of the inner side circular arc surface is set smaller than the radius of curvature $Ro$ of the outer side circular arc surface ($Ri \leq Ro$). The annular groove extends in a region from a position inside a position corresponding to a largest radial end of the inner raceway surface of the inner ring to a position beyond the position corresponding the largest radial end of the inner raceway surface by a predetermined distance through a rounded corner of the inner ring. This enables the cylinder to be easily deformed during the caulking process and thus to suppress deformation of the inner ring due to the caulking process.

The rounded corner of the inner ring has a circular arc surface in its cross-section having a predetermined radius of curvature $r1$. The radius of curvature $Ri$ of the inner side circular arc surface is set larger than the radius of curvature $r1$ of the rounded corner ($r1 \leq Ri$). This makes it possible to prevent the cylinder from being damaged, such as by cracks, during the caulking process, and the inner ring from being deformed.

The method of forming a wheel bearing apparatus comprises a bearing apparatus with an outer member, an inner member and double row rolling elements. The outer member is integrally formed, on its inner circumference, with double row outer raceway surfaces. The inner member includes a wheel hub and at least one inner ring. The inner member is formed with a double row inner raceway surfaces arranged opposite to the double row outer raceway surfaces. The wheel hub has an integrally formed wheel mounting flange at its one end. A cylindrical portion axially extends from the inner raceway surface. The inner ring is press-fit onto the cylindrical portion of the wheel hub. The double row rolling elements are rollably contained between the inner and outer raceway surfaces of the inner member and the outer member. The inner ring is axially rigidly secured by a caulking portion. The caulking portion is formed by plastically deforming the cylindrical portion of the wheel hub radially outward. A torque transmitting face-spline is formed on an end face of the caulking portion. The end portion of the cylindrical portion is pre-formed as a cylinder prior to its plastic deformation to form the caulking portion. A caulking tool includes a punch and a swing shaft. The punch has a nose portion projecting from a bottom surface of the punch at its center. The nose portion is adapted to abut against the end portion of the cylinder at a predetermined inclined angle relative to the inner circumferential surface of the cylinder. Teeth are formed around the nose portion to form the face-spline by plastically deforming the end face of the caulking portion. The swing shaft rigidly secures the punch so that the phase of the punch is not shifted relative to the wheel hub. The swing shaft has a central axis forming a predetermined inclined angle relative to a central axis of the wheel hub. The face-spline is formed simultaneously with the caulking portion by advancing the caulking tool toward the wheel hub and pushing the punch against the end portion of the cylinder with a predetermined working force. A main shaft, having a rotational axis corresponding to the central axis of the wheel hub, is rotated to cause a swing motion of the caulking tool. Thus, it is possible to simplify the structure of the metal molds, reduce the number of machining, assembly and management steps of the metal molds and ultimately the manufacturing cost. Accordingly, it is possible to prevent problems such as generation of burrs on the caulking portion and/or the face-spline and prevent the deposition of fallen-off burrs onto the working site. Thus, this improves the quality of the wheel bearing apparatus.

Further areas of applicability will become apparent from the description provided herein. The description and specific examples in this summary are intended for purposes of illustration only and are not intended to limit the scope of the present disclosure.

DETAILED DESCRIPTION

The present disclosure is a method of forming a wheel bearing apparatus. The wheel bearing apparatus includes an outer member, an inner member and double row rolling elements. The outer member has an integrally formed body mounting flange, to be mounted on a suspension apparatus. The outer member is integrally formed, on its inner circumference, with double row outer raceway surfaces. An inner member includes a wheel hub and at least one inner ring. The inner member is formed with a double row inner raceway surfaces that is arranged opposite to the double row outer raceway surfaces. The wheel hub has a wheel mounting flange integrally formed at its one end. A cylindrical portion axially extends from the inner raceway surface. The inner ring is press-fit onto the cylindrical portion of the wheel hub. The double row rolling elements are rollably contained between the inner and outer raceway surfaces of the inner member and the outer member. The inner ring is axially rigidly secured by a caulking portion. The caulking portion is formed by plastically deforming the cylindrical portion of the wheel hub radially outward. A torque transmitting face-spline is formed on an end face of the caulking portion. The end portion of the cylindrical portion is pre-formed as a cylinder prior to its plastic deformation to form the caulking portion. A caulking tool includes a punch and a swing shaft. The punch has a nose portion projecting from a bottom surface of the punch at its center. The nose portion is adapted to abut against the end portion of the cylinder at an angle of 15°-35° relative to the inner circumferential surface of the cylinder. Teeth are formed around the nose portion to form the face-spline by plastically deforming the end face of the caulking portion. The swing shaft rigidly secures the punch so that the phase of the punch is not shifted relative to the wheel hub. The swing shaft has a central axis that forms an inclined angle of 4°-6° relative to a central axis of the wheel hub. The face-spline is formed simultaneously with the caulking portion by advancing the caulking tool toward the wheel hub and pushing the punch against the end portion of the cylinder with a predetermined working force. A main shaft, having a rotational axis corresponding to the central axis of the wheel hub, is rotated to cause a swing motion of the caulking tool.

One preferred embodiment of the present disclosure will be hereinafter described with reference to the drawings.

Figure 1:
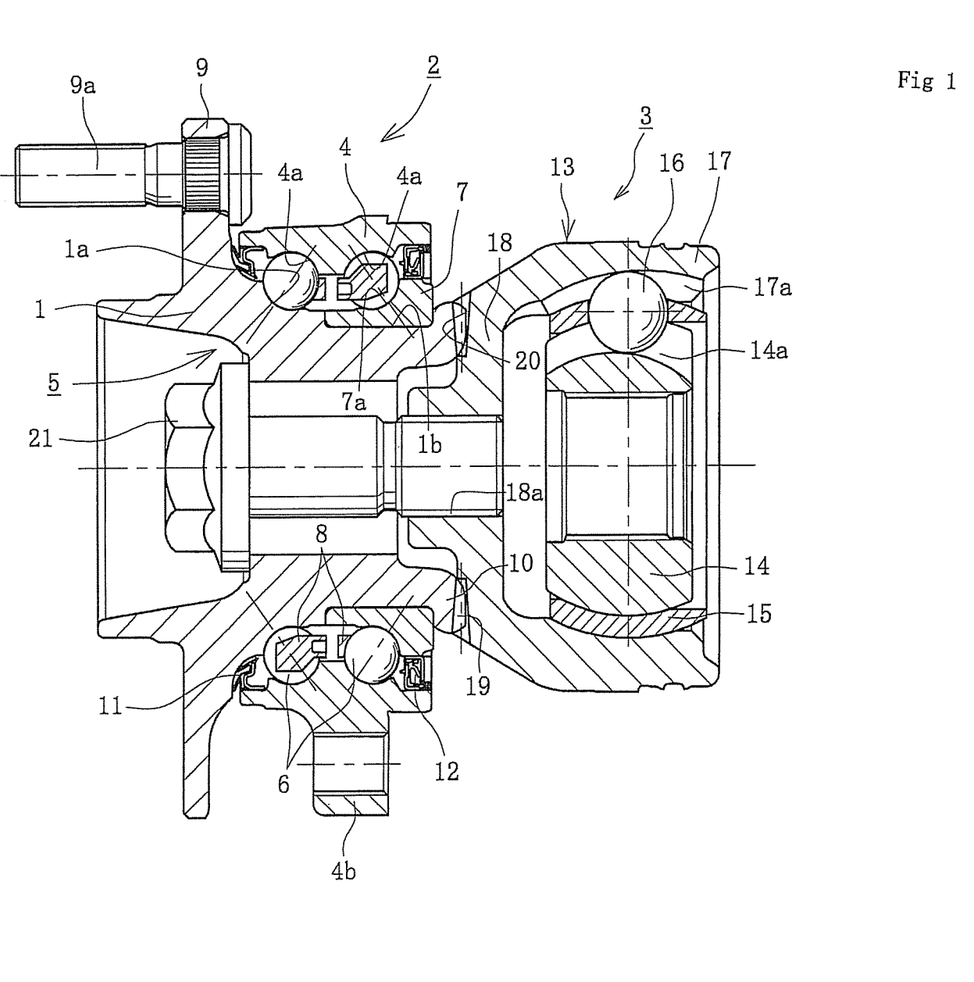
FIG. 1 is a longitudinal section view of a first embodiment of a vehicle wheel bearing apparatus.
Figure 2:
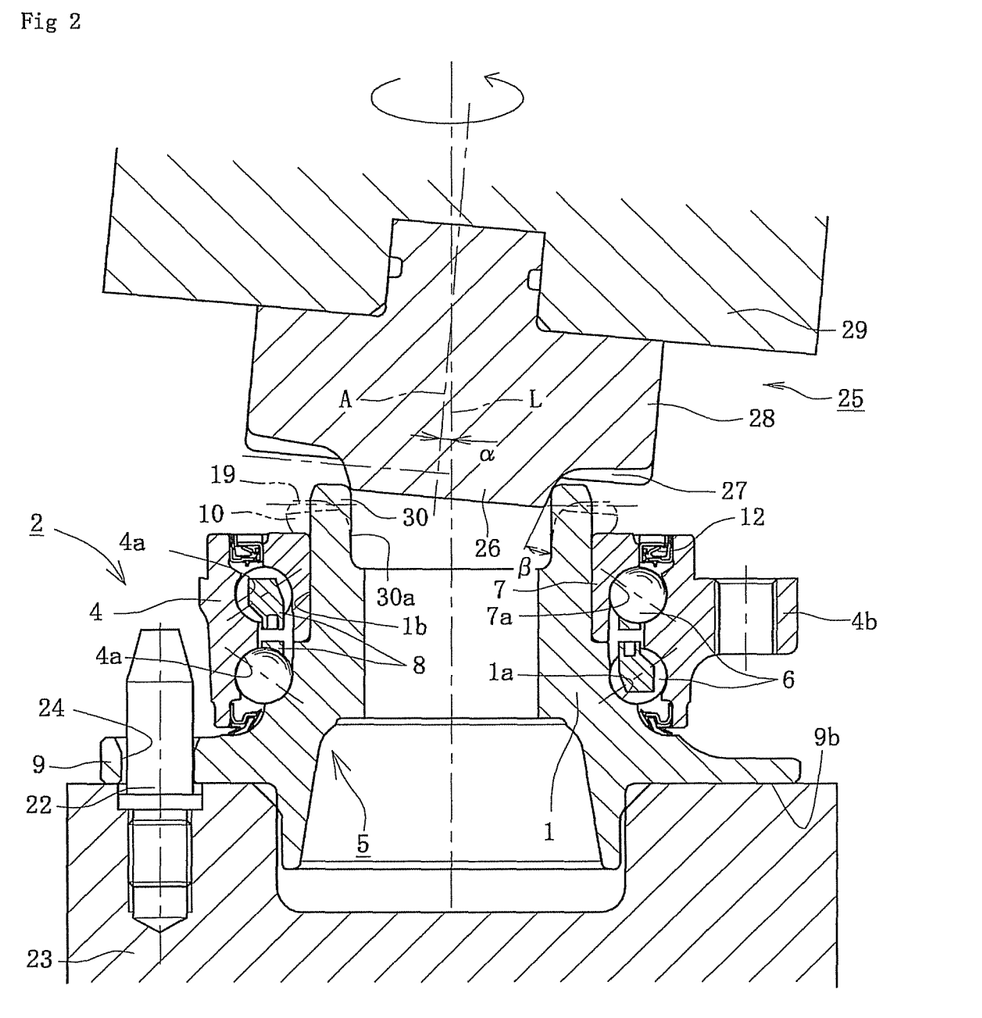
FIG. 2 is an explanatory view of a caulking process of FIG. 1.
Figure 3:
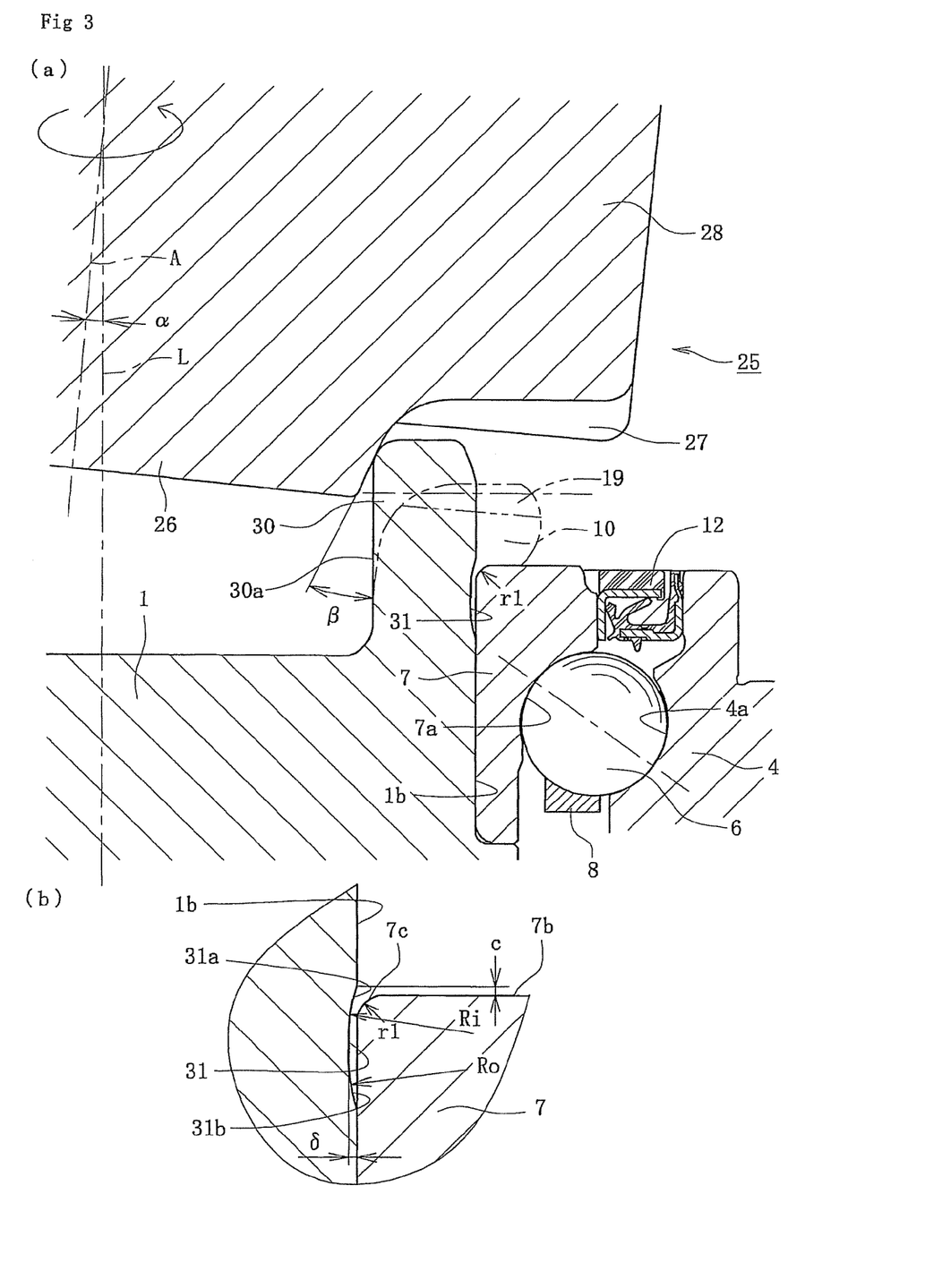
FIG. 3(a) is an enlarged partial view of FIG. 2.
FIG. 3(b) is a further enlarged partial view of FIG. 3(a).
Figure 4:
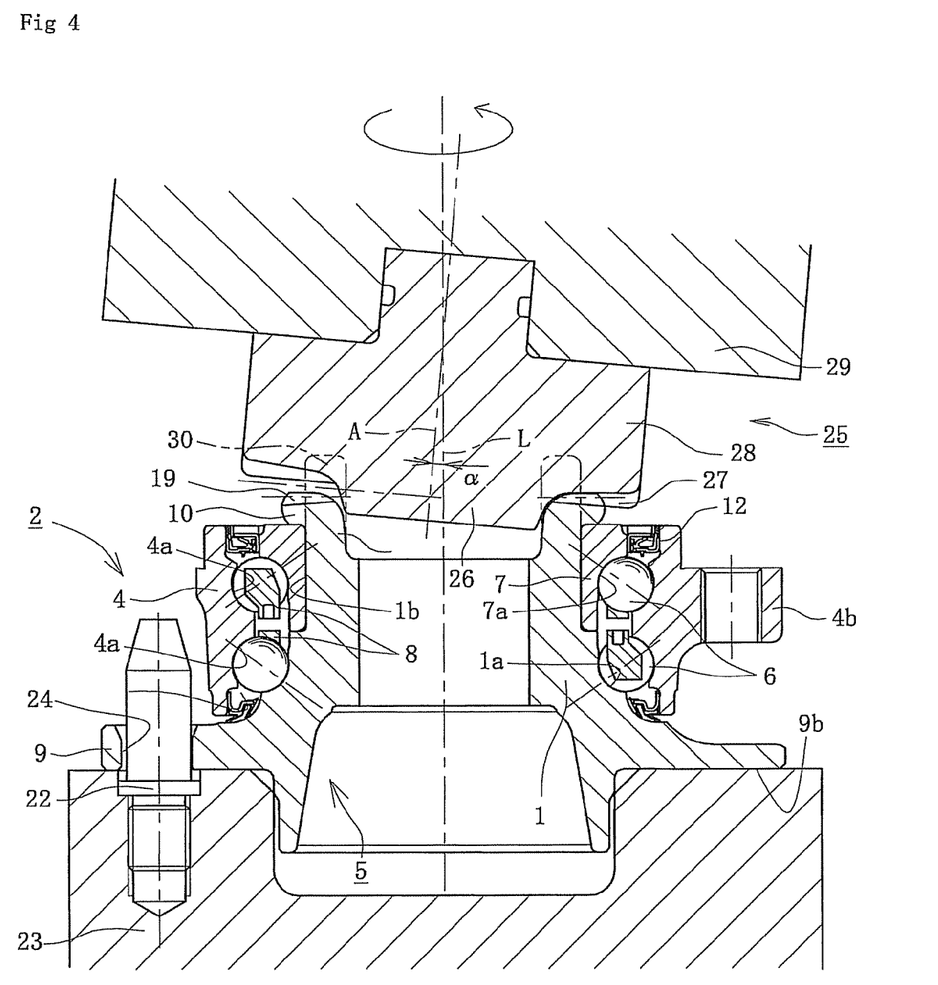
FIG. 4 is an explanatory view of the caulking process.

FIG. 1 is a longitudinal section view of one embodiment of the vehicle wheel bearing apparatus. FIG. 2 is an explanatory view of a caulking process of FIG. 1. FIG. 3(a) is an enlarged partial view of FIG. 2. FIG. 3(b) is a further enlarged partial view of FIG. 3(a). FIG. 4 is an explanatory view of the caulking process. In the description below, the term "outer-side" defines a side that is positioned outside of a vehicle body (left-hand side of FIG. 1). The term "inner-side" defines a side that is positioned inside of the vehicle body (right-hand side of FIG. 1) when the bearing apparatus is mounted on the vehicle body.

The wheel bearing apparatus is a so-called "third generation type" structure with a wheel hub 1, a double row rolling bearing 2 and a constant velocity universal joint 3 that are separate from one another and are united together. The double row rolling bearing 2 includes an outer member 4, an inner member 5, and double row rolling elements (balls) 6, 6.

The outer member 4 is made of medium/high carbon steel such as S53C including carbon of 0.40-0.80% by weight. The outer member 4 is integrally formed, on its outer circumference, with a body mount flange 4b. The body mounting flange 4b is adapted to be mounted on a body (not shown) of a vehicle. The outer member 4 includes, on its inner circumference, double row outer raceway surfaces 4a, 4a. The double row outer raceway surfaces 4a, 4a are hardened by high frequency induction quenching to have a surface hardness of 58-64 HRC.

The inner member 5 includes the wheel hub 1 and an inner ring 7. Double row inner raceway surfaces 1a, 7a are arranged opposite to the double row outer raceway surfaces 4a, 4a. The double row inner raceway surfaces 1a, 7a are formed, respectively, on the wheel hub 1 and the inner ring 7. The double row rolling elements 6, 6 are contained between the inner and outer raceway surfaces 1a, 7a; 4a, 4a and are rollably held by cages 8, 8. Seals 11, 12 are mounted in annular openings between the outer member 4 and the inner member 5. The seals 11, 12 prevent leakage of grease contained within the bearing apparatus as well as the entry of rain water or dusts into the bearing.

The wheel hub 1 is integrally formed, on its outer side end, with a wheel mounting flange 9 to mount a wheel (not shown). The wheel hub outer circumference includes an inner raceway surface 1a. A cylindrical portion 1b axially extends from the inner raceway surface 1a. The inner ring 7 is press-fit onto the cylindrical portion 1b, via a predetermined interference. Hub bolts 9a are secured on the wheel mounting flange 9 at circumferentially equidistant positions. The inner ring 7 is immovably axially secured relative to the wheel hub 1 by a caulking portion 10. The caulking portion 10 is formed by plastically deforming the end of the cylindrical portion 1b radially outward. The caulking portion 10 applies a predetermined pre-stress on the bearing.

The wheel hub 1 is made of medium/high carbon steel such as S53C including carbon of 0.40-0.80% by weight. The wheel hub is hardened by high frequency induction quenching to have surface hardness of 58-64 HRC in a region including a seal land portion, which slidably receives the outer side seal 11, to the cylindrical portion 1b, via the inner raceway surface 1a. The caulking portion 10 is not quenched so as to keep its hardness at that of a blank after forging. The inner ring 7 and the rolling elements 6 are formed of high carbon chrome steel such as SUJ2. They are dip hardened to their core to have a hardness of 54-64 HRC. This makes it possible, not only to improve the abrasion resistance of a base of the wheel mounting flange 9 forming the seal land portion, but also to improve the mechanical strength against the rotary bending load applied to the wheel mounting flange 9. Accordingly, it is possible to suppress the fretting abrasion caused between the fitting surfaces of the cylindrical portion 1b and the inner ring 7 and keep it to a minimum.

Although a third generation type is shown, with the inner raceway surface 1a directly formed on the circumference of the wheel hub 1, it is understood that the present disclosure may be applied to the first and second generation types where a pair of inner rings are press-fit onto a wheel hub. In addition, although shown with a double row angular contact ball bearing as the rolling elements 6, it may be possible to use tapered rollers as the rolling elements 6.

The constant velocity universal joint 3 includes an outer joint member 13, a joint inner ring 14, a cage 15, and torque transmitting balls 16. The outer joint member 13 includes a cup-shaped portion 17, a shoulder portion 18, that forms the bottom of the cup-shaped portion 17, and an inner thread 18a formed on the shoulder portion 18. Track grooves 17a, 14a that have a curve shaped are formed, respectively, on the inner circumference of the cup-shaped portion 17 and the outer circumference of the joint inner ring 14. The outer joint member 13 is made of medium/high carbon steel including carbon of 0.40-0.80% by weight such as S53C. The track grooves 17a, 14a and the outer circumference of the shoulder portion 18 are hardened by high frequency induction quenching to have a surface hardness of 58-64 HRC.

A face-spline 19 is formed on the end face of the caulking portion 10. Another face-spline 20, mating with the first face-spline 19, is formed on the end face of the shoulder portion 18 of the outer joint member 13 by a plastic deforming process. Oppositely arranged face-splines 19, 20 are press-contacted to each other by screwing of a fastening bolt 21 into the inner thread 18a formed in the shoulder portion 18. Thus, the wheel hub 1 and the outer joint member 13 are axially separably united.

Next, the forming process of the caulking portion 10 of FIG. 1 will be described with reference to FIGS. 2-4.

As shown in FIG. 2, the wheel hub 1 is vertically placed on a pedestal 23 that includes a plurality of knock-pins 22. The outer side surface 9b of the wheel mounting flange 9 contacts against the top surface of the pedestal 23. The knock-pins 22 fit through apertures 24 where the hub bolts 9a are press-fit. This makes it possible to firmly secure the wheel hub 1 on the pedestal 23 without applying any other fastening mechanism.

The end portion of the cylindrical portion 1b, that is to be plastically deformed to form the caulking portion 10, is pre-formed as a cylinder 30 prior to its plastic deformation. As shown in an enlarged view of FIG. 3, an annular groove 31 is formed on the outer circumferential surface of the cylinder 30 of the cylindrical portion 1b. A cross-sectional configuration of the annular groove 31 has a depth δ. An inner side circular arc surface 31a has a radius of curvature Ri. An outer side circular arc surface 31b has a radius of curvature Ro. This enables the cylinder 30 to be easily deformed during the caulking process and thus to suppress deformation of the inner ring 7. The annular groove 31 extends in a region from a position inside a position corresponding to a largest radial end of the inner raceway surface 7a of the inner ring 7 to a position beyond the position corresponding to the largest radial end of the inner raceway surface 7a through a rounded corner 7c of the inner ring 7 by a predetermined distance "c" from the largest end face 7b. The larger the width of the annular groove 31 the lower the hoop stress. However, if the width of the annular groove 31 is too large, not only will a predetermined fastening force of the inner ring 7 not be obtained due to a lack of pressing force against the inner ring 7 but also the strength and rigidity of the wheel hub 1 would be detracted.

The annular groove 31 has a depth 5 of 0.5-1.0 mm. If the depth 5 is smaller than 0.5 mm, the effect brought by the provision of the annular groove 31 would be detracted. On the contrary, if the depth 5 is larger than 1.0 mm, the strength of the caulking portion 10 would be insufficient. The radius of curvature Ri of the inner side circular arc surface 31a is set equal to or larger than the radius of curvature r1 of the rounded corner 7c and equal to or smaller than the radius of curvature Ro of the outer side circular arc surface 31b (r1≤Ri≤Ro). This enables the cylinder 30 to be easily deformed during the caulking process and thus to suppress deformation of the inner ring 7 due to the caulking process.

If the radius of curvature r1 of a rounded corner 7c is set smaller than 1.0 mm, damages such as micro cracks would be caused due to stress concentration at the root of the caulking portion 10 when any bending moment is applied to the wheel bearing apparatus during driving of a vehicle. On the contrary, if the radius of curvature r1 is larger than 2.5 mm, the inner ring 7 would be expanded radially outward when the cylinder 30 is plastically deformed and thus excessive hoop stress would be caused in the outer circumference of the inner ring 7.

A caulking tool 25 includes a punch 28 and a swing shaft 29. The punch 28 has a nose portion 26 that projects from a bottom surface of the punch 28 at its center. Teeth 27 are formed around the nose portion 26 to form the face-spline 19 by plastically deforming the end face of the caulking portion 10. The swing shaft 29 has a central axis A forming a predetermined inclined angle α relative to a central axis L of the wheel hub 1. The inclined angle α is set within a range of 4°-6°. The punch 28 is secured to the swing shaft 29, via a key, so that it cannot rotate relative to the swing shaft 29.

The nose portion 26 of the punch 28 is formed so that it is adapted to abut against the end portion of the cylinder 30 at a predetermined inclined angle β relative to the inner circumferential surface 30a of the cylinder 30. The inclined angle β is set within a range of 15-35°.

As shown in FIG. 4, the face-spline 19 is formed simultaneously with the formation of the caulking portion 10. They are formed by plastic deformation by the advancing of the caulking tool 25 toward the cylinder 30 of the wheel hub 1 and pushing the punch 28 against the end portion of the cylinder 30 with a predetermined working force. A main shaft (not shown), having a rotational axis corresponding to the central axis L of the wheel hub 1, is rotated to cause a swing motion of the caulking tool 25.

According to the present disclosure, the caulking portion 10 and the face-spline 19 on the end face of the caulking portion 10 can be simultaneously formed by plastic deformation by the integral punch 28. Thus, it is possible to simplify the structure of the metal molds and reduce the number of machining, assembly and management steps of the metal molds. This reduces the manufacturing cost. Accordingly, it is possible to prevent problems, such as the generation of burrs on the caulking portion 10 and/or the face-spline 19 and deposition of fallen-off burrs onto the working site. Thus, it is possible to improve the quality of the wheel bearing apparatus.

The method for forming a wheel bearing apparatus can be applied to forming a wheel bearing apparatus where a wheel bearing portion with a wheel hub and a constant velocity universal joint are connected via face-splines in a torque transmittable manner. The two are separably united via a screw mechanism.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A method for forming a wheel bearing apparatus comprising:
    an outer member integrally formed, on its inner circumference, with double row outer raceway surfaces;
    an inner member including a wheel hub and at least one inner ring, the inner member is formed with a double row inner raceway surfaces on its outer circumference to be arranged opposite to the double row outer raceway surfaces, the wheel hub has a wheel mounting flange integrally formed at one end, a cylindrical portion extends axially from the wheel mounting flange, the inner ring is press-fit onto the cylindrical portion of the wheel hub;
    double row rolling elements are rollably contained between the inner and outer raceway surfaces of the inner member and the outer member;
    the inner ring is axially rigidly secured by a caulking portion, the caulking portion is formed by plastically deforming the cylindrical portion of the wheel hub radially outward;
    a face-spline for transmitting torque is formed on an end face of the caulking portion;
    an end portion of the cylindrical portion is pre-formed as a cylinder prior to its plastic deformation to form the caulking portion;
    a caulking tool includes a punch and a swing shaft, the punch has a nose portion projecting from a bottom surface of the punch at its center, the nose is adapted to abut against an end portion of the cylinder at a predetermined inclined angle ($\beta$) relative to an inner circumferential surface of the cylinder, teeth are formed around the nose portion to form the face-spline by plastically deforming the end face of the caulking portion, and the swing shaft rigidly secures the punch so that a phase of the punch is not shifted relative to the wheel hub, the swing shaft has a central axis (A) forming a predetermined inclined angle ($\alpha$) relative to a central axis (L) of the wheel hub; and
    the face-spline is formed simultaneously with the formation of the caulking portion by advancing the caulking tool toward the wheel hub and pushing the punch against the end portion of the cylinder with a predetermined working force, and a main shaft having a rotational axis corresponding to the central axis of the wheel hub is rotated to cause a swing motion of the caulking tool.

2. The method for forming a wheel bearing apparatus of claim 1, wherein the inclined angle ($\alpha$) of the central axis (A) of the swing shaft relative to the central axis (L) of the wheel hub is set within a range of 4°-6°.

3. The method for forming a wheel bearing apparatus of claim 1, wherein the inclined angle ($\beta$) of the nose portion of the punch is set within a range of 15°-35°.

4. The method for forming a wheel bearing apparatus of claim 1, wherein the punch is secured to the swing shaft via a key.

5. The method for forming a wheel bearing apparatus of claim 1, wherein the wheel hub is vertically placed on a pedestal with a plurality of mounted knock-pins so that an outer side surface of the wheel mounting flange contacts against the top surface of the pedestal, the knock-pins fit through apertures where hub bolts are press-fit.

6. The method for forming a wheel bearing apparatus of claim 1, wherein an annular groove is formed on an outer circumferential surface of the cylinder of the cylindrical portion, a cross-sectional configuration of the annular groove has a depth ($\delta$) of 0.5-1.0 mm, an inner side circular arc surface of the annular groove has a radius of curvature (Ri) and an outer side circular arc surface of a radius of curvature (Ro), the radius of curvature (Ri) of the inner side circular arc surface is set equal to or smaller than the radius of curvature (Ro) of the outer side circular arc surface (Ri≤Ro) groove extends in a region from a position inside a position corresponding to a largest radial end of the inner raceway surface of the inner ring to a position beyond the position corresponding the largest radial end of the inner raceway surface through a rounded corner of the inner ring by a predetermined distance (c) from a face of the largest radial end of the inner ring.

7. The method for forming a wheel bearing apparatus of claim 6, wherein the rounded corner of the inner ring has a circular arc surface in its cross-section having a predetermined radius of curvature (r1), and the radius of curvature (Ri) of the inner side circular arc surface is set equal to or larger than the radius of curvature (r1) of the rounded corner (r1≤Ri).

* * * * *

UNITED STATES PATENT AND TRADEMARK OFFICE
CERTIFICATE OF CORRECTION

| | |
|---|---|
| PATENT NO. | : 8,631,581 B2 |
| APPLICATION NO. | : 12/945090 |
| DATED | : January 21, 2014 |
| INVENTOR(S) | : Akira Sera et al. |

Page 1 of 1

It is certified that error appears in the above-identified patent and that said Letters Patent is hereby corrected as shown below:

In the Specification

<u>Column 8</u>
Line 20      "5" should be --δ--.
Line 21      "5" should be --δ--.
Line 23      "5" should be --δ--.

Signed and Sealed this
Twenty-seventh Day of May, 2014

Michelle K. Lee
*Deputy Director of the United States Patent and Trademark Office*